United States Patent
Verdes et al.

(10) Patent No.: US 7,329,034 B2
(45) Date of Patent: Feb. 12, 2008

(54) MULTI-LEVEL SURFACE MOUNTED LIGHTPIPE PACKAGE DESIGN WITH LED LIGHT SOURCES

(75) Inventors: Anthony Verdes, Brick, NJ (US); Klaus Oesterheld, Middletown, NJ (US); John R. McNamara, Jackson, NJ (US)

(73) Assignee: Dialight Corporation, Farmingdale, NJ (US)

( * ) Notice: Subject to any disclaimer, the term of this patent is extended or adjusted under 35 U.S.C. 154(b) by 121 days.

(21) Appl. No.: 10/378,841

(22) Filed: Mar. 5, 2003

(65) Prior Publication Data

US 2004/0174716 A1    Sep. 9, 2004

(51) Int. Cl.
*F21V 7/04*    (2006.01)

(52) U.S. Cl. ...................... 362/555; 362/581; 362/616; 362/800

(58) Field of Classification Search ............... 362/555, 362/551, 581, 582, 800, 552, 556, 558, 616, 362/240; 40/547
See application file for complete search history.

(56) References Cited

U.S. PATENT DOCUMENTS

| | | | | |
|---|---|---|---|---|
| 5,327,328 A | * | 7/1994 | Simms et al. | 362/555 |
| 5,345,367 A | * | 9/1994 | Pierce et al. | 362/555 |
| 5,349,504 A | * | 9/1994 | Simms et al. | 362/555 |
| 6,554,463 B2 | * | 4/2003 | Hooker et al. | 362/555 |
| 6,623,152 B1 | * | 9/2003 | Kroening | 362/555 |

* cited by examiner

*Primary Examiner*—Sandra O'Shea
*Assistant Examiner*—Bao Q. Truong
(74) *Attorney, Agent, or Firm*—Oblon, Spivak, McClelland, Maier & Neustadt, P.C.

(57) ABSTRACT

A multi-level optical device that includes a housing. Further, a multi-level lightpipe is placed in the housing and includes at least two paths for passing light. A lightpipe barrier can optionally be placed between the at least two paths in the multi-level lightpipe, to provide enhanced separation between the light passing through the two paths. Further, a plurality of light emitting diodes (LEDs) are provided in the housing. Respective ones of the plurality of LEDs provide light input into a respective one of the paths of the multi-level lightpipe. The multi-level lightpipe can take the form of a bi-level prism, and the plurality of LEDs may be multi-color LEDs. A light-bleeding preventing device can be positioned between the at least two paths in the multi-level lightpipe. The multi-level lightpipe can also include plural multi-level lightpipes arranged in a row to create a matrix of output light signals.

18 Claims, 8 Drawing Sheets

MULTI-LEVEL SURFACE MOUNTED LIGHTPIPE PACKAGE DESIGN WITH LED LIGHT SOURCES

BACKGROUND OF THE INVENTION

1. Field of the Invention

The present invention relates generally to a multi-level structure for mounting visual indicators on printed circuit boards. This structure may be particularly directed to mounting light-emitting diodes (LEDs) on printed circuit boards using surface mount technology in conjunction with a multi-level lightpipe design as an integrated unit.

2. Discussion of the Background

Often it is necessary to mount visual indicators such as LEDs on a printed circuit board with the light elevated above the surface of the board and/or with the LED near to one edge of the board. Each of such requirements create special problems in the mounting of the LEDs.

U.S. Pat. Re 34,254 discloses a background technique for surface mounting an LED package. In that background technique the surface mounted LED package includes a housing mounted on the LED and having a generally rectangular shape with a passageway extending such that it receives light from the LED and guides the light from the LED to a lens at a radiating surface.

However, that background art disclosed in U.S. Pat. Re 34,254 is particularly adapted to be utilized in conjunction with a single LED.

A further background art of U.S. Pat. No. 5,349,504 discloses a multi-level lightpipe designed housing utilized with surface mounted LEDs. The multi-level lightpipe includes two or more separate passageways for separately redirecting and transmitting light from two or more separate light sources, such as two or more separate LEDs.

However, that device disclosed in U.S. Pat. No. 5,349,504 utilizes a separate structure for the multi-level lightpipe and the LEDs. That is, in the device disclosed in U.S. Pat. No. 5,349,504 a housing is provided for the multi-level lightpipe, but an integrated structure of a multi-level lightpipe and the LEDs is not disclosed.

OBJECTS OF THE INVENTION

Accordingly, an object of the present invention is to provide a novel multi-level lightpipe design using surface mounted LEDs.

A further object of the present invention is to provide the novel multi-level lightpipe design with the surface mounted LEDs in an integrated housing.

A further object of the present invention is to provide a multi-level lightpipe design to be used with surface mounted LEDs which is simple to construct and mount on an appropriate surface.

SUMMARY OF THE INVENTION

The present invention in a preferred embodiment is directed to a multi-level optical device that includes a housing. Further, a multi-level lightpipe is placed in the housing and includes at least two paths for passing light. A lightpipe barrier can optionally be placed in the housing between the at least two paths in the multi-level lightpipe, to provide enhanced separation between the light passing through the two paths. Further, a plurality of light emitting diodes (LEDs) are provided in the housing. Respective ones of the plurality of LEDs provide light input into a respective one of the paths of the multi-level lightpipe.

In one embodiment of the present invention the multi-level lightpipe can take the form of a bi-level prism, and the plurality of LEDs may be multi-color LEDs.

As a further feature of the present invention a light-bleeding preventing device can be positioned between the at least two paths at an output point in the multi-level lightpipe.

As a further feature of the present invention the multi-level lightpipe can include plural multi-level lightpipes arranged in a row to create a matrix of output light signals.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
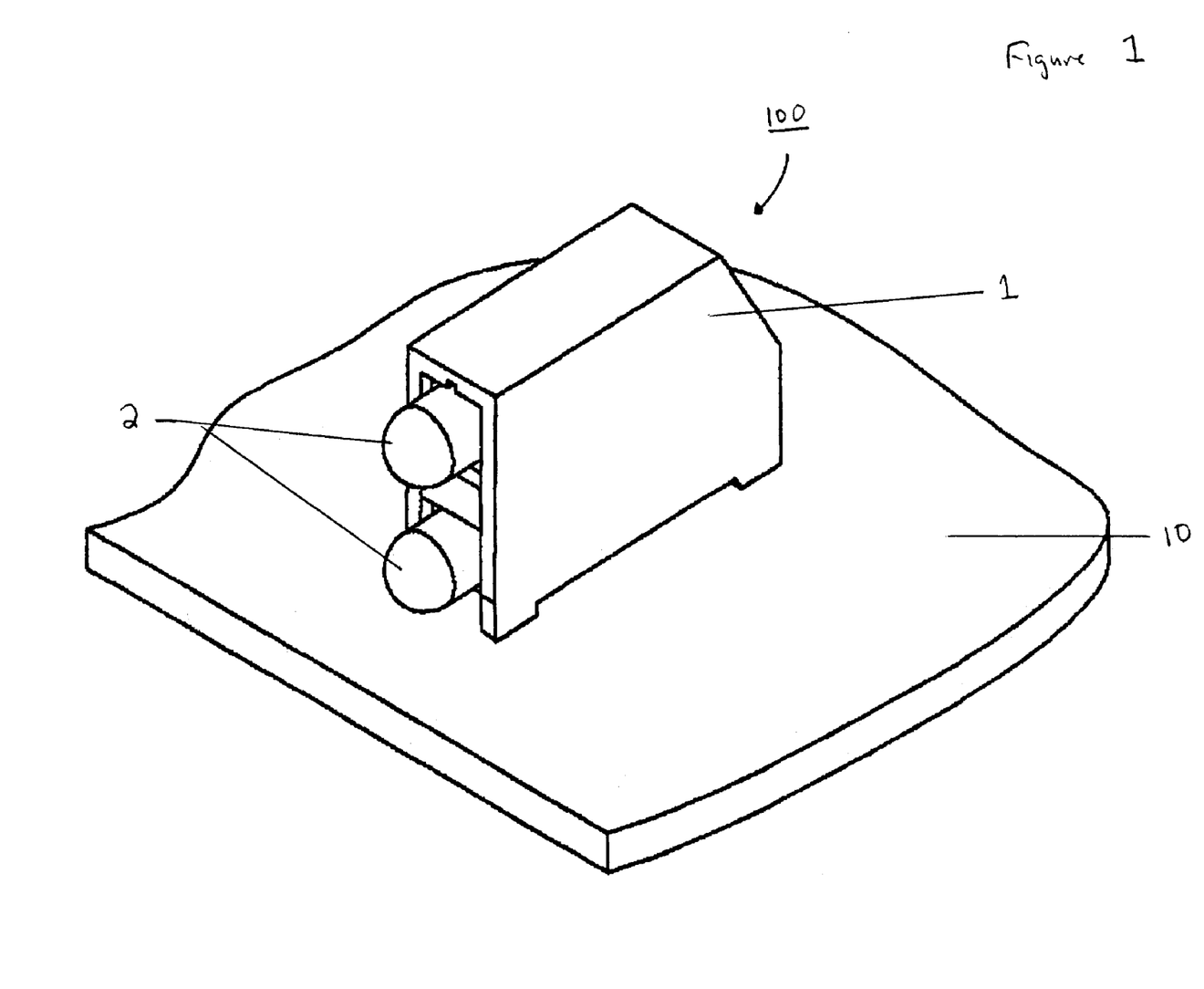
FIG. 1 shows a multi-level lightpipe package of one embodiment of the present invention in a completed form and mounted on a surface.

Referring now to the drawings, wherein like reference numerals designate identical or corresponding parts throughout the several views, and more particularly to FIG. 1, an embodiment of a multi-level lightpipe package 100 of the present invention mounted on a surface 10 is shown. The surface 10 can be, for example, the surface of a printed circuit board or any other type of surface on which light emitting devices, such as LEDs, can be mounted.

The multi-level lightpipe package 100 of the present invention is designed to be an integrated unit that includes both the light emitting elements, which are preferably LEDs, and the structure for guiding light from the light emitting elements to an appropriate output position. By forming an integrated member including those elements, manufacturing of such an integrated element can be simplified, and the placing of such an integrated member at an appropriate spot such as on a printed surface board can be simplified. Thus, the present invention provides the benefits of ease of manufacture and use by its integrated design. That is, the present invention allows a customer to only have a single insertion instead of multiple insertions, saving a user time and cost.

As shown in FIG. 1, the multi-level lightpipe package 100 includes a housing 1 and a multi-level lightpipe 2 provided in the housing 1. In the specific embodiment shown in FIG. 1 the multi-level lightpipe 2 is a bi-level prism. However, it should be clear to those of ordinary skill in the art that the multi-level lightpipe 2 is not limited to a bi-level prism but could have three or more levels. The housing 1 can be formed of a material that can survive a reflow process, such as Amodel manufactured by Amoco Plastics.

Figure 2:
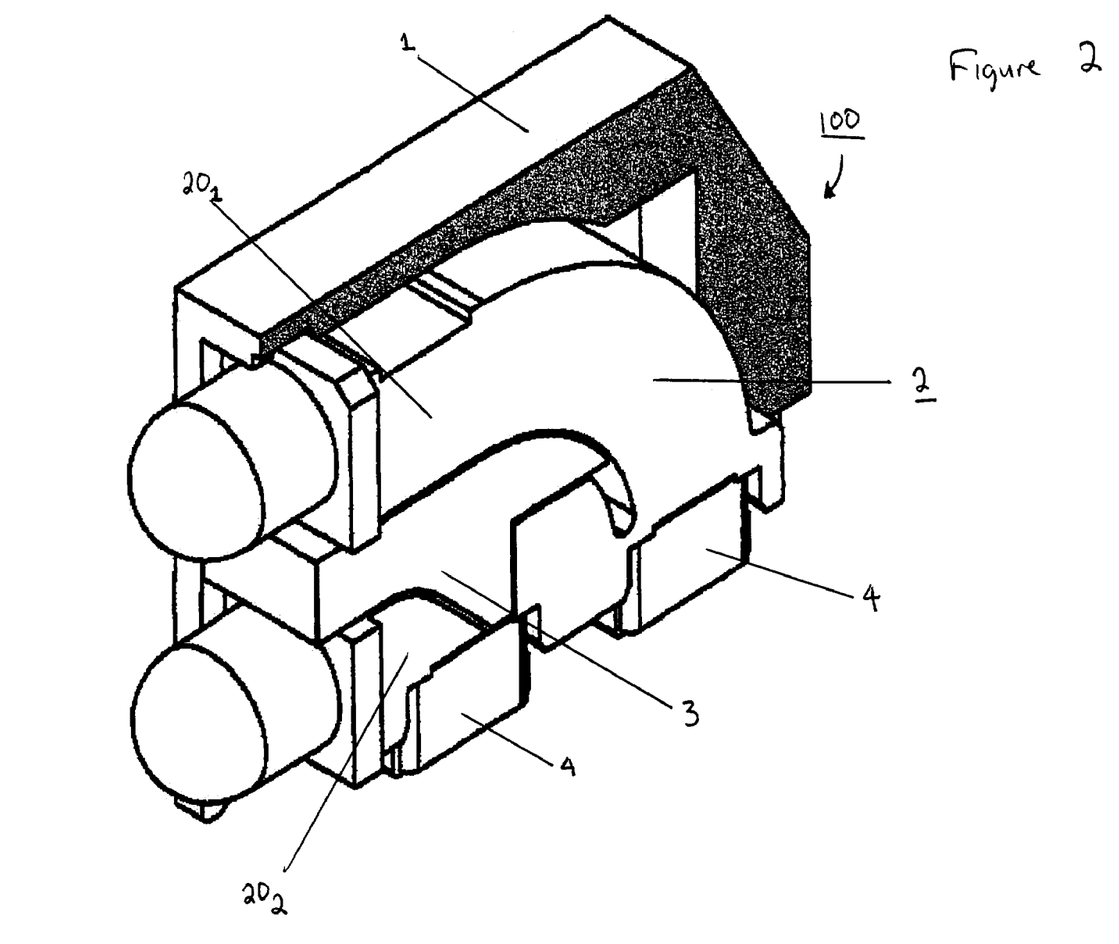
FIG. 2 shows the multi-level lightpipe package of FIG. 1 in a cut-away view.

Turning to FIG. 2, a cut-away view of the multi-level lightpipe package 100 of FIG. 1 is shown. As shown in further detail in FIG. 2, the bi-level lightpipe 2 includes two light paths $20_1$, $20_2$ and is provided within the housing 1. Also provided within the housing 1 are two light emitting diodes (LEDs) 4. Each of the LEDs 4 is mounted to provide light to one of the two light paths $20_1$, $20_2$ of the bi-level lightpipe 2. Further, an optional lightpipe barrier 3 is provided between the two different paths $20_1$, $20_2$ of the bi-level lightpipe 2 to extend through the housing 1. That lightpipe barrier 3 prevents light from leaking between the two different paths $20_1$, $20_2$ of the bi-level lightpipe 2.

The bi-level lightpipe 2 can be formed of any material that can effectively pass light from an LED, such as polycarbonate. The material for the bi-level lightpipe 2 also needs to survive a reflow process, and needs proper optical clarity and to minimize the loss of light output, such as Hysol manufactured by Loctite. The lightpipe barrier 3 can be formed of a material dense enough to block light such as Valox manufactured by GE Plastics. The LEDs 4 may be any type of conventional LED such as a single color LED of a PLCC-2 type surface mount package or a bi-color LED of a PLCC-4 type surface mount, both made by Osram or Agilent.

Figure 3:
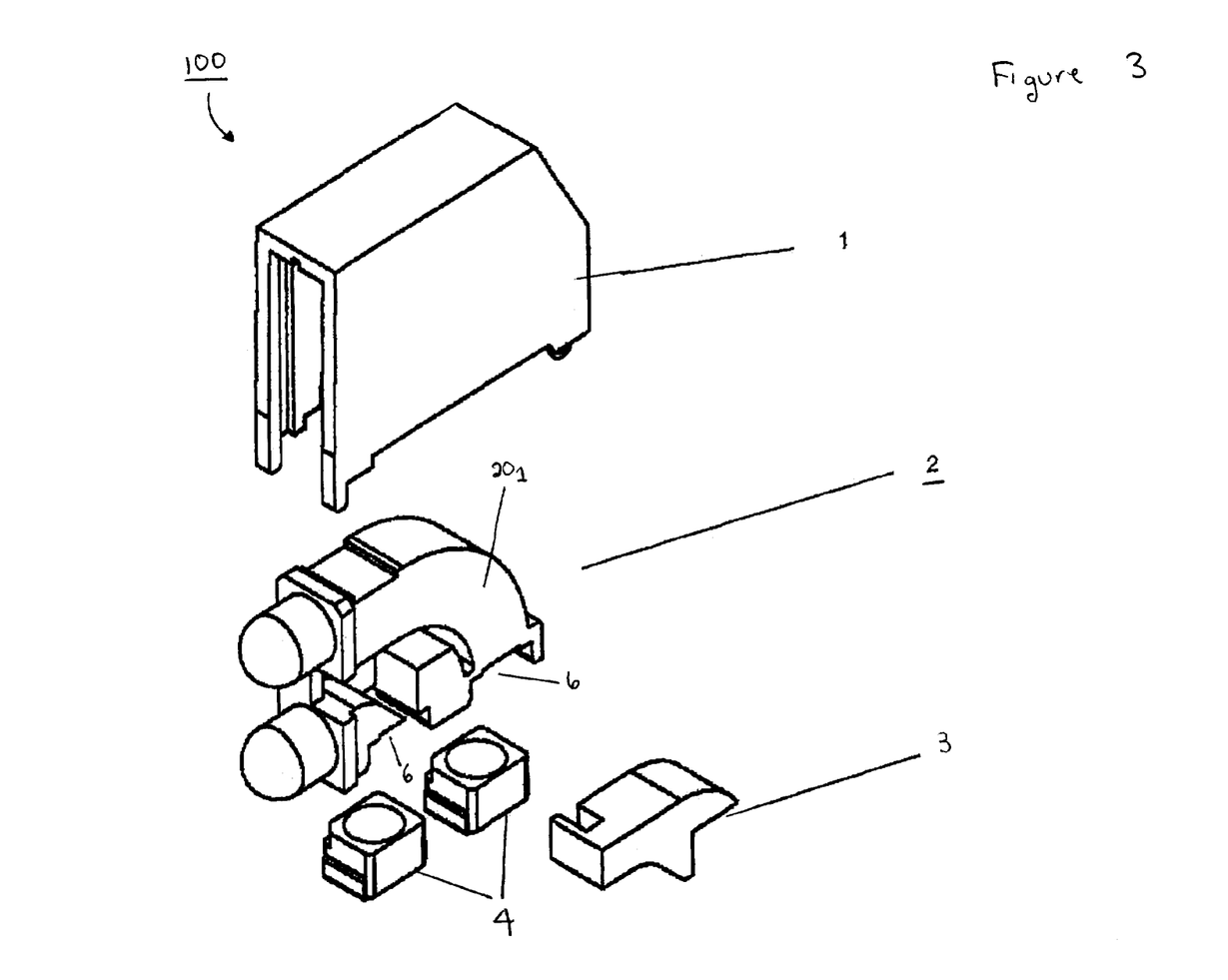
FIG. 3 shows the multi-level lightpipe package of FIG. 1 in an exploded view.

FIG. 3 shows the multi-level lightpipe package 100 in an exploded view. As shown in FIG. 3 the bi-level lightpipe 2 includes LED pockets 6 that are designed to receive the LEDs 4, and to provide proper coupling between the LEDs 4 and the two light paths $20_1$, $20_2$ in the bi-level lightpipe 2.

Figure 4A:
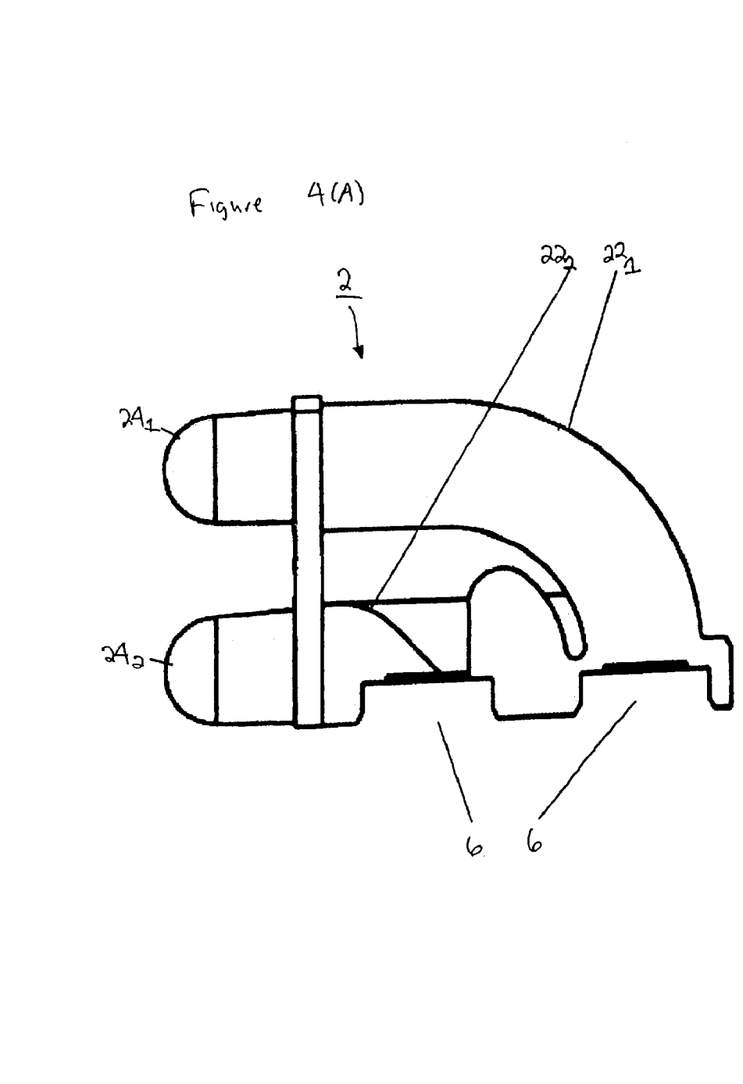
FIG. 4(A) and FIG. 4(B) show further features of the multi-level lightpipe package of FIG. 1.
Figure 4B:
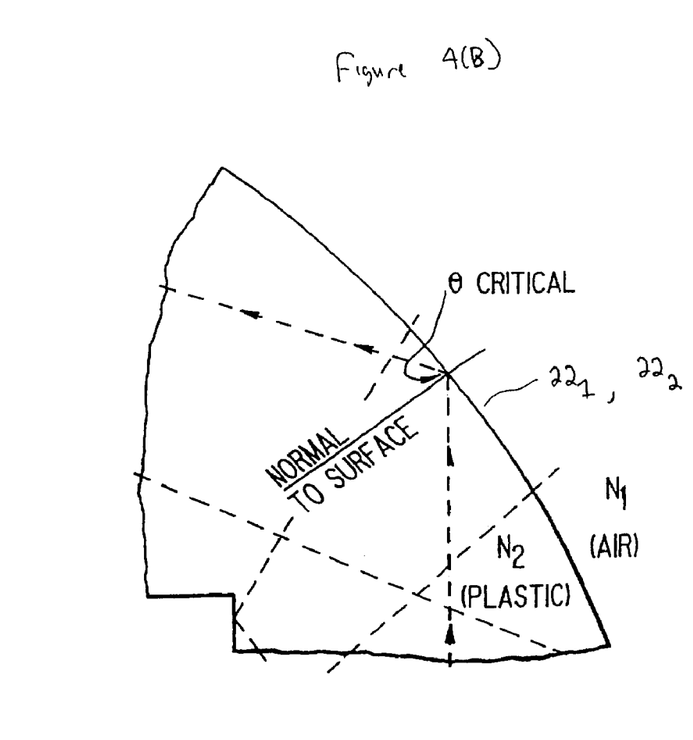

With respect to FIGS. 4(A) and 4(B), FIG. 4(A) shows a side view of the bi-level lightpipe 2, which as discussed above includes the LED pockets 6. Further, each of the two light paths $20_1$, $20_2$ includes limiting surfaces $22_1$, $22_2$, output radiating surfaces $24_1$, $24_2$, and other surfaces that optically and mechanically define the two light paths $20_1$, $20_2$ to optimally conduct light from the LEDs 4 provided in the LED pocket 6 to the output radiating surfaces $24_1$, $24_2$. To determine the appropriate shape of the light paths $20_1$, $20_2$ and the limiting surfaces $22_1$, $22_2$, the critical angle required to maintain internal reflection through the light paths $20_1$, $20_2$ must be determined. The light rays should be redirected where feasible by designing the reflecting wall to prevent an angle greater than the critical angle.

With respect to FIG. 4(B), the critical angle of a material surrounded by air is defined by $\theta = \arcsin(1/N)$, where N is the index of refraction for the material under evaluation and $\theta$ is the angle between the light rays striking a surface and aligned normal to that surface. For polycarbonate, as one example, N=1.52 and thus $\theta=41°$.

In FIG. 4(A), the first radiating portion $24_1$ and the second radiating portion $24_2$ are viewed by a user. Where it is not feasible to redirect light to the desired viewing area, an opposing wall can be designed to present an angle lower than the critical angle, allowing light to escape in an area other than a normally viewed area.

As noted above, the multi-level lightpipe package 100 of the present invention utilizes two light emitting diodes $4_1$ one for each light paths $20_1$, $20_2$ of the bi-level lightpipe 2. Those LEDs 4 can be either single color LEDs or multi-color LEDs.

Figure 5A:
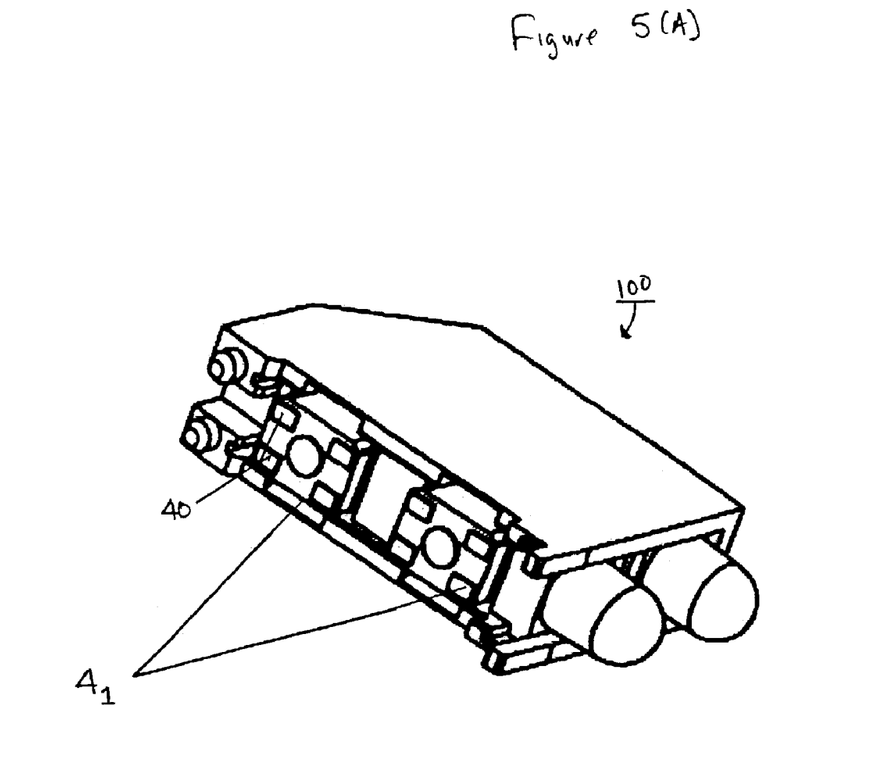
FIGS. 5(A) and 5(B) show two variations of LEDs used in the multi-level lightpipe package of FIG. 1.
Figure 5B:
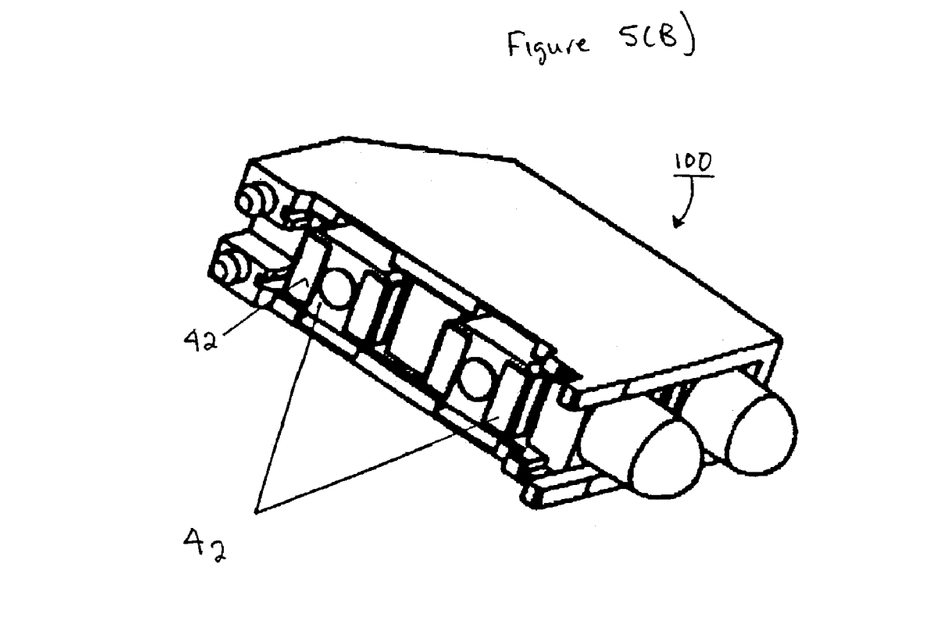

FIGS. 5(A) and 5(B) show a bottom view of the different electrical contacts that would be utilized based on different types of LEDs 4. FIG. 5(A) shows an embodiment in which the LEDs 4 are multi-color LEDs $4_1$ in which each multi-color LED $4_1$ includes four electrical contacts 40, so that a total of eight electrical contacts are provided. The embodiment of FIG. 5(B) shows the LEDs 4 in the form of single color LEDs $4_2$ that each include two electrical contacts, so that a total of four electrical contacts 42 are needed. Those electrical contacts 40, 42 are to be aligned with appropriate contacts on the surface 10 when mounting the multi-level lightpipe package 100 of the present invention.

Figure 6:
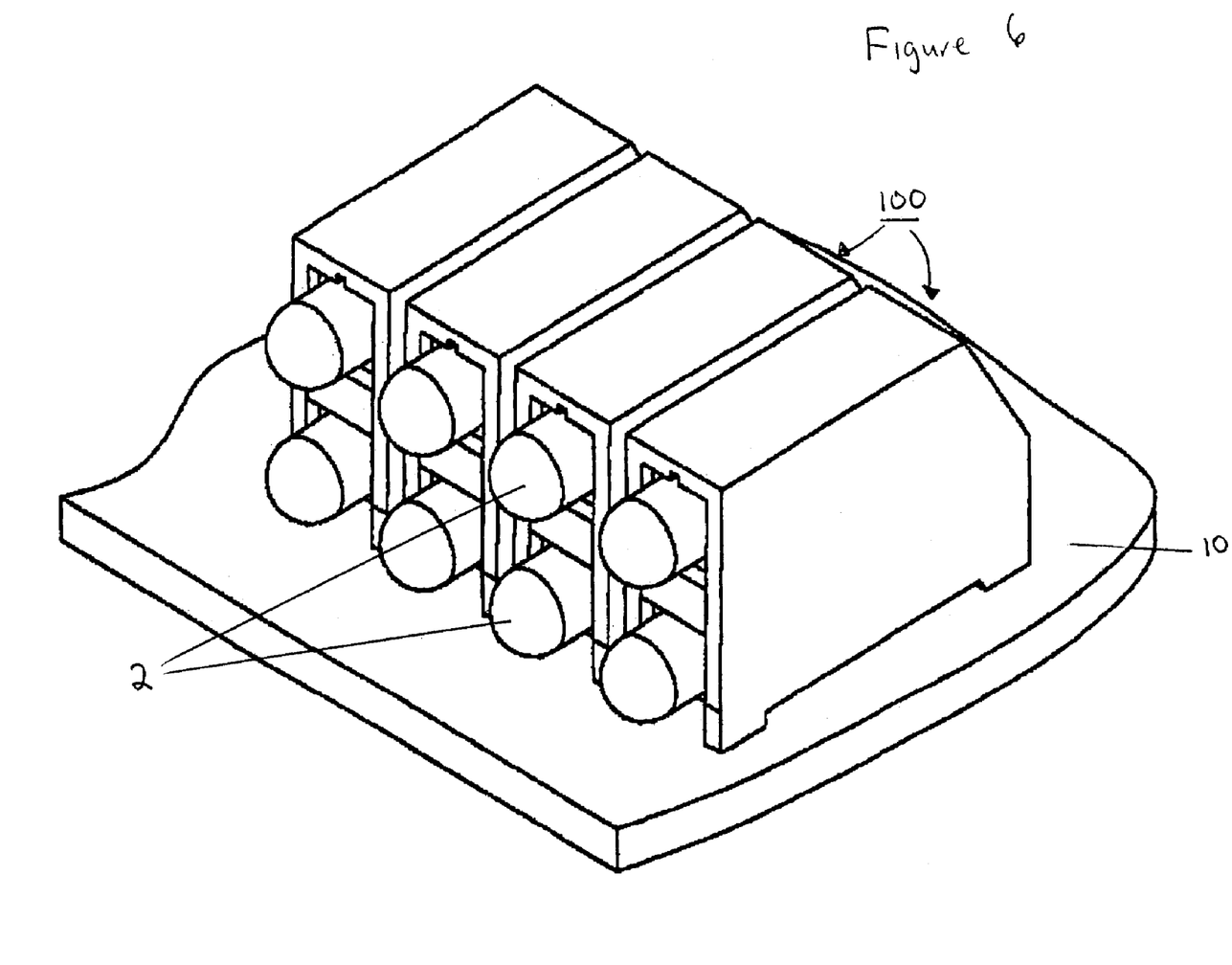
FIG. 6 shows utilizing plural multi-level lightpipe packages of FIG. 1 to form a lightpipe matrix.

FIG. 6 shows one arrangement in which plural of the multi-level lightpipe packages 100 of FIGS. 1-5 can be arranged in a row on a surface 10 to essentially form a matrix of lightpipes 2.

Figure 7:
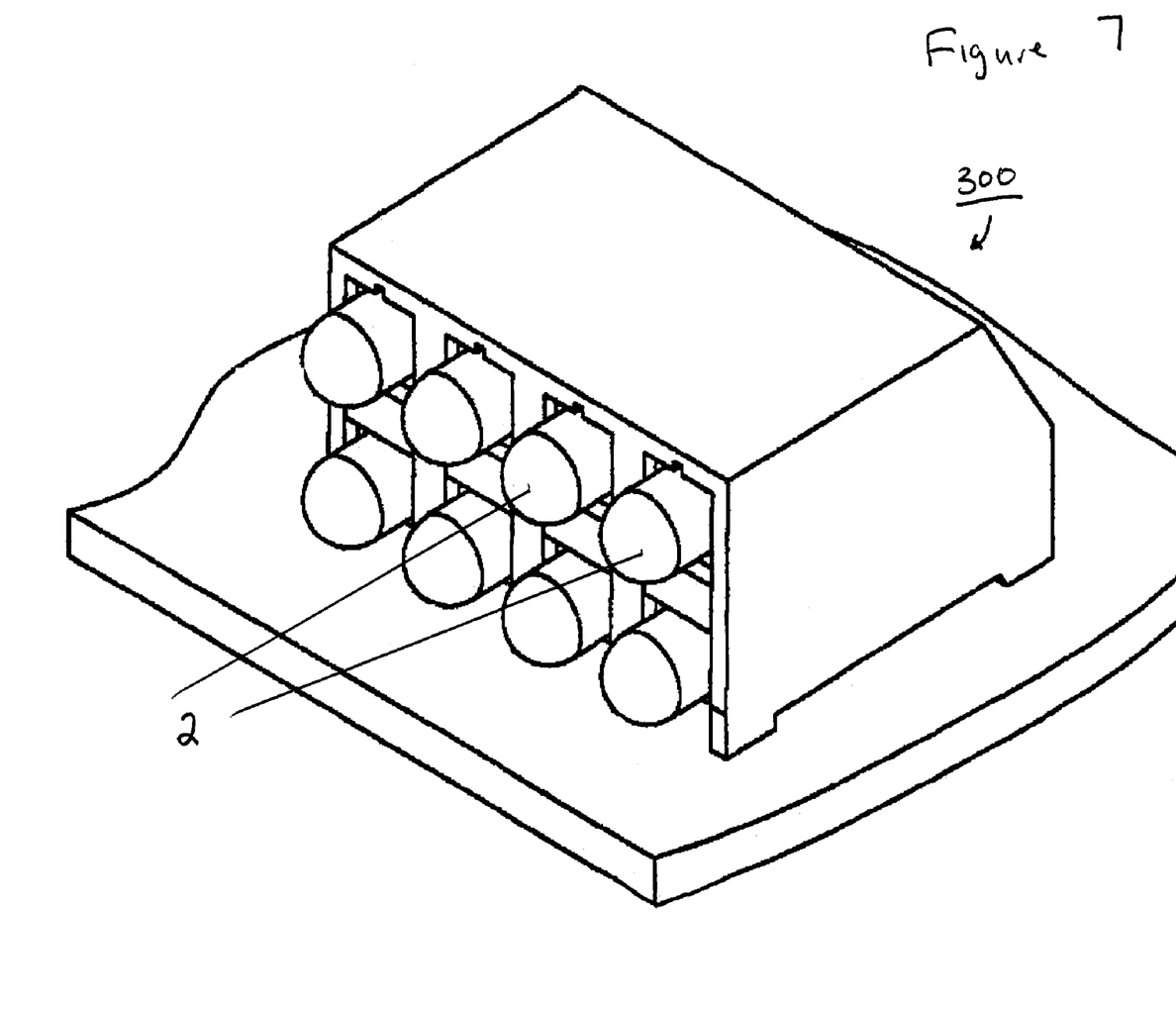
FIG. 7 shows a modification of the multi-level lightpipe package of the present invention to form a matrix of lightpipes.

As a modification of the embodiment of FIG. 6, instead of using multiple multi-level lightpipe packages 100 as shown in FIGS. 1-5, a single housing type multi-level lightpipe package 300 as shown in FIG. 7 can be implemented. In the embodiment of FIG. 7 a single unitary housing is provided to house all of the multi-level lightpipes 2.

By utilizing the structures discussed above of the multi-level lightpipe package of the present invention, a device that unitarily includes both lightpipes and LEDs in a housing can be realized. By forming a multi-level lightpipe package as a unitary device, that package can be easily mounted on a surface, and particularly in multiple rows to form a matrix of light outputs.

In the embodiment shown in the above-noted figures the light barrier 3 is provided to prevent light from leaking between the two different paths $20_1$, $20_2$ of the bi-level lightpipe 2. As noted above that lightpipe barrier 3 is optional.

Figure 8:
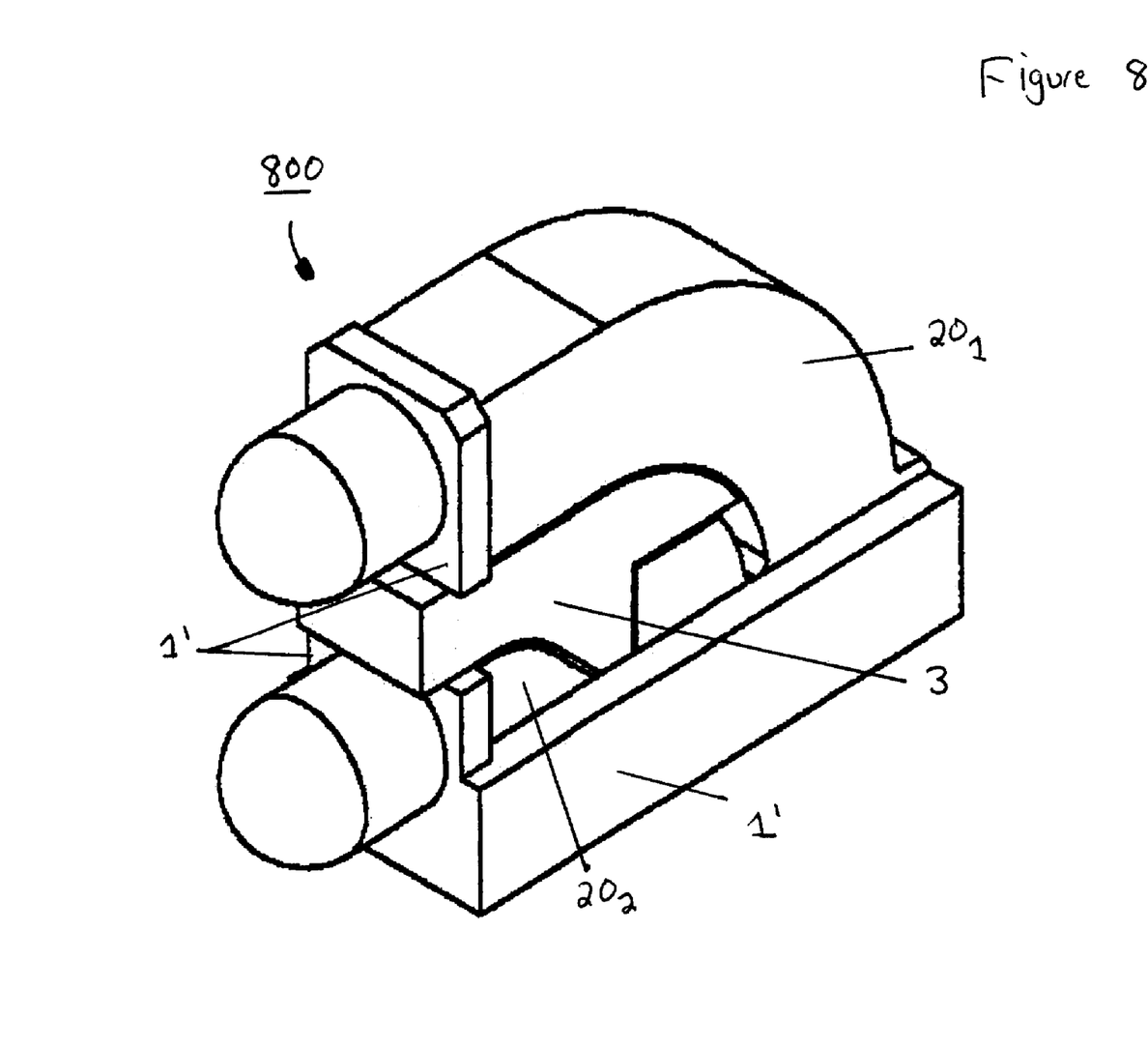
FIG. 8 shows a modification of the multi-level lightpipe package of the present invention.

In a further embodiment of the present invention shown in FIG. 8, a multi-level light pipe package 800 is identical to the previous embodiment in FIG. 3 except that the full housing 1 is not utilized, and a housing 1' that is essential cut-away except at a bottom side and a front edge is provided. The multi-level light pipe package 800 of FIG. 8 has the benefit of not requiring a full housing, but only a portion of a housing at a very front and at a bottom.

In other aspects of the further embodiment shown in FIG. 8 the multi-level lightpipe package 800 is identical to that in the earlier figures, and that multi-level lightpipe package 800 in FIG. 8 can also be implemented to form a matrix of lightpipes as shown in FIGS. 6 and 7.

Obviously, numerous additional modifications and variations of the present invention are possible in light of the present teachings. It is therefore to be understood that within the scope of the appended claims, the present invention may be practiced otherwise than as specifically described herein.

What is claimed as new and desired to be secured by Letters Patent of the United States is:

1. A multi-level optical device comprising:
   (a) a unitary housing;
   (b) a multi-level lightpipe placed in said unitary housing and including at least two paths each for passing light, the unitary housing surrounding the multi-level light pipe at a top portion and both of side portions; and
   (c) a plurality of light emitting diodes (LEDs) placed in said unitary housing, wherein respective of said plurality of LEDs provide light input into a respective of said paths of said multi-level lightpipe.

2. The multi-level optical device according to claim 1, further comprising:
   (d) a lightpipe barrier, formed of a different material than a material of the multi-level light pipe, and formed of a material dense enough to block light, placed in said unitary housing between said at least two paths in the multi-level lightpipe.

3. The multi-level optical device according to claim 1, wherein said multi-level lightpipe (b) comprises a bi-level prism.

4. The multi-level optical device according to claim 2, wherein said multi-level lightpipe (b) comprises a bi-level prism.

5. The multi-level optical device according to claim 1, wherein said plurality of LEDs (d) comprise multi-color LEDs.

6. The multi-level optical device according to claim 2, wherein said plurality of LEDs (d) comprise multi-color LEDs.

7. The multi-level optical device according to claim 1, wherein said multi-level lightpipe (b) includes plural multi-level lightpipes arranged in a row.

8. The multi-level optical device according to claim 1, wherein the at least two paths of the multi-level lightpipe are formed of separate unconnected light path elements.

9. The multi-level optical device according to claim 2, wherein the at least two paths of the multi-level lightpipe are formed of separate unconnected light path elements.

10. A multi-level optical device comprising:
   (a) unitary housing means for housing elements;
   (b) multi-level lightguiding means placed in said unitary housing means and including at least two paths each for passing light, the unitary housing surrounding the multi-level light pipe at a top portion and both of side portions; and
   (c) a plurality of light emitting means placed in said unitary housing means, wherein respective of said plurality of light emitting means provide light input into a respective of said paths of said multi-level lightguiding means.

11. The multi-level optical device according to claim 10, further comprising:
   (d) lightpipe barrier means, formed of a different material than a material of the multi-level light pipe, and formed of a material dense enough to block light, placed in said unitary housing means between said at least two paths in the multi-level lightguiding means for reducing interference between said at least two paths.

12. The multi-level optical device according to claim 10, wherein said multi-level lightguiding means (b) comprises a bi-level prism.

13. The multi-level optical device according to claim 11, wherein said multi-level lightguide means (b) comprises a bi-level prism.

14. The multi-level optical device according to claim 10, wherein said plurality of light emitting means (d) comprise multi-color LEDs.

15. The multi-level optical device according to claim 11, wherein said plurality of light emitting means (d) comprise multi-color LEDs.

16. The multi-level optical device according to claim 10, wherein said multi-level lightguide means (b) includes plural multi-level lightguides arranged in a row.

17. The multi-level optical device according to claim 10, wherein the at least two paths of the multi-level lightguiding means formed of separate unconnected light path elements.

18. The multi-level optical device according to claim 11, wherein the at least two paths of the multi-level lightguiding means are formed of separate unconnected light path elements.

* * * * *